Dec. 14, 1965  D. MOHLER ET AL  3,223,899
ELECTRICAL CAPACITOR AND TANTALUM-CONTAINING ELECTRODE
MATERIAL THEREFOR
Filed Jan. 4, 1961
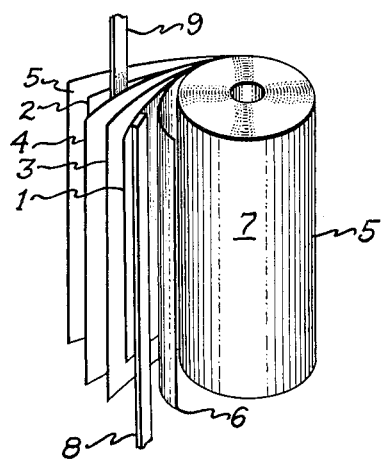
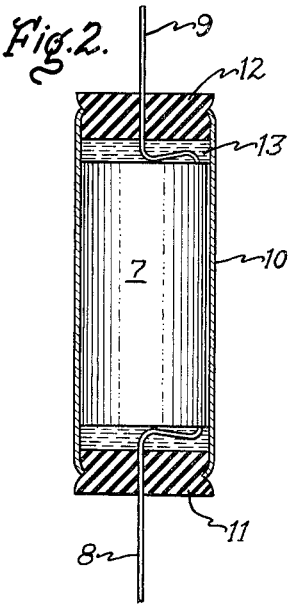
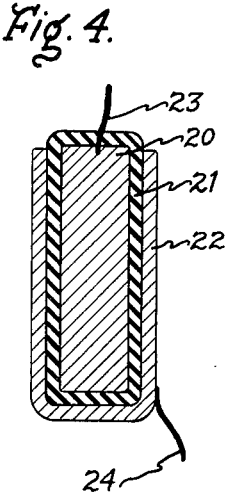
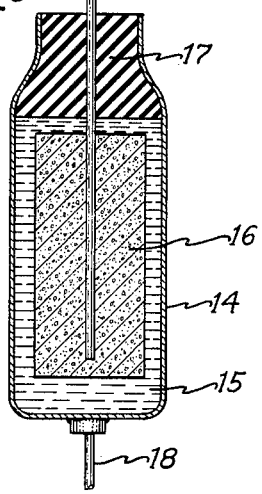
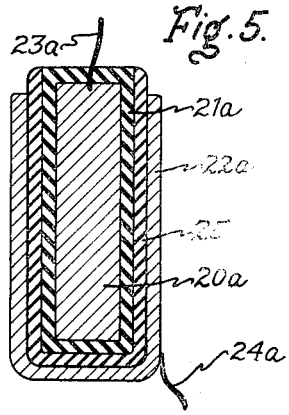
Inventors,
Donald Mohler,
William E. Tragert,
by Sidney Greenberg
Their Attorney United States Patent Office 3,223,899
Patented Dec. 14, 1965

3,223,899
ELECTRICAL CAPACITOR AND TANTALUM-CON-
TAINING ELECTRODE MATERIAL THEREFOR
Donald Mohler, Saratoga Spa, and William E. Tragert,
Scotia, N.Y., assignors to General Electric Company, a
corporation of New York
Filed Jan. 4, 1961, Ser. No. 80,569
10 Claims. (Cl. 317—230)

The present invention relates to electrical capacitors, and more particularly to novel tantalum-containing electrode material therefor.

Electrical capacitors, especially those of the electrolytic type, commonly employ metal electrodes on which a thin dielectric oxide coating has been formed. When compared with the various film-forming metals heretofore employed as electrodes in capacitors, tantalum affords numerous advantages. Tantalum electrodes, for example, produce capacitors having more stable electrical characteristics and longer life in relation to similar capacitors made with other metals such as aluminum, particularly under low temperature conditions. Tantalum, however, has a rather high density, and in addition to increasing the cost of capacitors, this factor makes the use of this material in pure state undesirable in certain applications where low weight is of considerable importance.

It is an object of this invention to provide electrical capacitors having novel tantalum-containing film-forming electrodes.

It is another object of the invention to provide capacitor electrode material composed of a tantalum alloy which is lighter in weight than pure tantalum electrodes without sacrificing the superior electrical, mechanical, and thermal properties of substantially pure tantalum electrodes.

With the above objects in view, there is provided in accordance with the invention an electrical capacitor having a film-forming electrode composed of an alloy of tantalum and germanium, the electrode being characterized by high unit capacitance and other electrical properties making it particularly suitable for capacitor application.

The invention will be better understood from the following description and the accompanying drawing, in which:

FIG. 1 shows an electrolytic capacitor assembly of rolled type in which the invention may be embodied;

FIG. 2 shows the capacitor assembly of FIG. 1 arranged in a casing; and

FIGS. 3, 4 and 5 illustrate other types of capacitors to which the invention is applicable.

Referring now to the drawing, and particularly to FIG. 1, the capacitor shown comprises a pair of metal foils 1 and 2, one or both of which is composed of a tantalum-germanium alloy as hereinafter more fully described, and having a dielectric oxide film on the surface thereof, the foils in the operation of the capacitor having opposite polarity. Between foils 1 and 2 are one or more sheets of dielectric spacer material 3, 4, 5 and 6 composed conventionally of kraft paper or other suitable spaced material of a porous saturable nature used to separate the foils. Terminals or tap straps 8 and 9 are secured to the respective foils and extend from the foils in opposite directions. The electrode foils and dielectric sheets are wound into a compact roll 7 prior to insertion into a casing as shown in FIG. 2.

In FIG. 2 the capacitor roll assembly 7 is shown enclosed in a metal casing 10 with terminals 8 and 9 extending respectively through insulating plugs or discs 11, 12 fluid-tightly sealing the interior the casing. A suitable electrolyte 13 such as an aqueous ammonium pentaborate glycol solution fills the casing and impregnates the porous spaced material.

FIG. 3 shows a different type of electrolytic capacitor comprising a casing 14 serving as the cathode and containing an electrolyte 15 in which an anode 16 is immersed. Casing 14 may be silver or any metal which does not adversely affect the fill electrolyte or become corroded thereby. In this embodiment, the anode 16 is formed of the tantalum-germanium alloy of the present invention by powder metallurgy techniques, wherein particles of the alloy are pressed and sintered into a porous compact mass or slug in accordance with known processes to provide a large surface area. A film-forming lead wire 19 made of the same alloy, or of aluminum, tantalum or other film-forming metal, is embedded in the slug anode 16 and passes to the exterior of casing 14 through an insulating sealing disc or plug 17 around which casing 14 is crimped to provide a fluid-tight closure for the capacitor. At the opposite end of the capacitor, a cathode lead 18 is suitably joined by welding or otherwise to the outside of casing 14.

Slug anode 16 of the FIG. 3 capacitor as well as one or both foils 1, 2 of the FIG. 1 capacitor are preferably provided with a thin anodic dielectric oxide film in accordance with anodizing processes well-known in the art.

FIG. 4 diagrammatically shows in exaggerated scale a so-called dry-type capacitor which may embody the invention and which comprises a base electrode 20 composed of the tantalum-germanium alloy of the invention, an anodic dielectric oxide film 21 overlying the base electrode, and a counter-electrode 22 in the form of a thin metal coating overlying oxide film 21 and spaced thereby from base electrode 20. Electrode layer 22 may be composed of any suitable conducting material such as aluminum, gold, tin, lead, zinc, or the equivalent, and may be applied by any metallizing or other suitable depositing procedure. Leads 23 and 24 are attached by any suitable means to electrodes 20 and 22, respectively.

FIG. 5 shows a dry-type capacitor similar to that of FIG. 4 except that a layer 25 of semi-conductor material such as $MnO_2$ is interposed between the dielectric oxide layer 21a and the counter electrode 22a, the base electrode 20a also being composed of a tantalum-germanium alloy in accordance with the invention.

The base electrode material of the dry-type capacitors of the FIGS. 4 and 5 embodiments, instead of being of solid, integral form as shown, may be composed of a compacted, sintered mass of particles of the tantalum-germanium alloy, similar to the form of anode shown in FIG. 3. The counter-electrodes of these capacitors may, if desired, be made of combined or composite layers. For example, in the semi-conducting layer embodiment, graphite may be deposited over the semi-conducting layer prior to deposition of an outer metallic conducting layer on the graphite.

In accordance with the present invention, at least one of the capacitor electrodes, and more particularly the anode, is composed of an alloy of tantalum and germanium, such alloy having been found to have excellent film-forming properties and adapted to form dielectric oxide films of superior electrical characteristics by ordinary anodizing processes.

In general the tantalum is present in a preponderant amount in the present alloy, with an amount of about 70%–96% tantalum apparently being optimum.

The tantalum-germanium alloy of the invention provides unexpectedly good results for capacitor application especially when it is considered that germanium itself does not form a dielectric oxide film. The beneficial results of such an alloy has further been found surprising in view of the fact that it has heretofore been commonly believed that in order to obtain best results in capacitors using tantalum as electrode material, the tantalum must be substantially pure. Previously, it has generally been the trend in the art to improve the film-forming characteristics and dielectric properties of metal oxide films by the use of more purified electrode metals, but we have found on the contrary that improved results are obtained by alloying tantalum with a substantial amount of another metal which in itself is not a film-forming material.

The composition of the oxide films formed on the tantalum alloy of the present invention is not definitely known, and it has not been determined that the proportions of the metals in the dielectric oxide in fact match the composition of the base alloy. However, because of the superior dielectric properties observed for this alloy in comparison with the pure (unalloyed) component metals, it is conceivable that some form of mixed oxides of the alloy are produced.

In tests made to determine the properties of the alloy of the invention when used as a capacitor electrode, a number of samples of different tantalum-germanium alloys were anodized in an electrolyte solution prepared from a mixture of ethylene glycol, water, boric acid, and ammonium hydroxide and having a resistivity of approximately 250 ohm-centimeters. The alloy samples were anodized to 75 volts D.C. and the voltage stabilized at this level for 15 minutes. The thus anodized electrode samples having the composition shown in the table below were then made the anode in a capacitor containing a fill electrolyte having the same composition as the anodizing electrolyte, with a sheet of tantalum serving as the cathode. The results obtained in these tests are shown in the following table:

Table I

| Alloy, Wt. Percent | Capacitance, $\mu$f./in.$^2$ (120 c.p.s.) | Dissipation Factor, Percent (120 c.p.s.) |
| --- | --- | --- |
| 71.36% Ta—28.64% Ge | 1.95 | 68 |
| 90.87% Ta—9.13% Ge | 0.97 | 12 |
| 95.70% Ta—4.30% Ge | 1.78 | 45 |

Considering that substantially pure tantalum, a conventionally used electrolytic capacitor electrode material, has under the same conditions a capacitance of about 1.0 $\mu$f./in.$^2$ and a dissipation factor of 10–20%, it is apparent that the above alloys provide extremely satisfactory results in electrolytic capacitor application. When compared to aluminum, another well known electrolytic capacitor electrode material, which provides a capacitance of 0.5 $\mu$f./in.$^2$ when anodized under the same conditions, the improvement afforded by the present alloys over this metal is quite considerable.

Aside from the above comparisons, the present alloy offers substantial benefits over pure tantalum electrodes principally because of the much lower density of the alloy material and the lower cost. Whereas tantalum has a specific gravity of about 16, the specific gravity of germanium is about 5, and thus the present alloys are generally of substantially lower density than tantalum alone. It will be thus apparent that by the use of the present anodized tantalum-germanium alloy as an electrode material, a substantial reduction in the weight of the capacitors can be achieved without sacrifice in the efficiency of operation of the capacitors.

The alloys described were prepared by arc melting the constituent elements in the desired proportion in an argon atmosphere, cold crucible arc furnace. This melting procedure is similar to that described in Metal Progress, Vol. 63, 1953, p. 70, or Review of Scientific Instruments, Vol. 25, 1954, p. 596, or Transactions AIME, Vol. 188, 1950, p. 485. It will be realized, however, that the essence of the invention resides in filmed electrodes made of the alloys and not in the particular means of preparing the alloys. Techniques such as vacuum arc melting, vacuum induction melting, sintering, hot pressing, etc., will suggest themselves to those skilled in the art as possible alternatives which may in certain cases actually be preferable to the technique used here.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. An electrical capacitor comprising, in combination, a pair of electrodes and a dielectric oxide film formed on one of said electrodes, at least said one electrode comprising an alloy of tantalum and germanium.

2. An electrical capacitor comprising spaced electrodes, at least one of said electrodes comprising an alloy of tantalum and germanium, at least said one electrode having formed thereon an anodic dielectric oxide film arranged between said electrodes.

3. An electrical capacitor comprising, in combination, a pair of electrodes, at least one of said electrodes comprising a tantalum-germanium alloy containing a preponderant amount of tantalum, at least said one electrode having formed thereon an anodic dielectric oxide film arranged between said electrodes.

4. An electrical capacitor comprising spaced electrodes, at least one of said electrodes comprising an alloy composed of about 70–96% by weight of tantalum and about 30–4% by weight of germanium, at least said one electrode having formed thereon an anodic dielectric film arranged between said electrodes.

5. An electrical capacitor comprising, in combination, a pair of electrodes and an electrolyte in contact therewith, at least one of said electrodes comprising a tantalum-germanium alloy containing a preponderant amount of tantalum, said one electrode having an anodic dielectric film formed thereon.

6. An electrical capacitor comprising, in combination, a first electrode layer comprising an alloy of tantalum and germanium, a dielectric film composed of an oxide of said alloy formed on said first electrode layer, and a second electrode layer superposed on said dielectric oxide film and spaced thereby from said first electrode layer.

7. An electrical capacitor comprising, in combination, a first electrode layer composed of an alloy of tantalum and germanium, a dielectric film composed of an oxide of said alloy formed on said first electrode layer, a layer of semi-conducting material superposed on said dielectric oxide film, and a second electrode layer superposed on said layer of semi-conductive material and spaced by the latter and the dielectric film from said first electrode layer.

8. An electrode for electrical capacitors comprising an alloy of tantalum and germanium, said electrode having a dielectric oxide film formed thereon.

9. An electrode for electrical capacitors comprising a base member composed of an alloy of tantalum and germanium, said base member having a dielectric oxide film formed thereon, and a layer of semi-conductive material overlying said dielectric oxide film.

10. An electrode for electrical capacitors comprising an alloy of about 70–96% by weight of tantalum and about 30–4% by weight of germanium, said electrode having an anodic dielectric film formed thereon.

References Cited by the Examiner

UNITED STATES PATENTS

| 715,126 | 12/1902 | Nodon | 317—233 |
|---|---|---|---|
| 1,684,684 | 9/1928 | Read | 317—233 |
| 2,005,279 | 6/1935 | Van Geel | 317—233 |
| 2,083,254 | 6/1937 | Cowles | 317—230 |
| 3,067,367 | 12/1962 | Ross | 317—230 |

FOREIGN PATENTS 644,501   10/1928   France.

DAVID J. GALVIN, *Primary Examiner.*

LLOYD McCOLLUM, JAMES D. KALLAM,
*Examiners.*